United States Patent [19]
Cecchi et al.

[11] Patent Number: 5,491,462
[45] Date of Patent: Feb. 13, 1996

[54] JOYSTICK CONTROLLER

[75] Inventors: Marino Cecchi, Hawthorn Woods; Guerrino Suffi, Addison, both of Ill.

[73] Assignee: Wico Corporation, Niles, Ill.

[21] Appl. No.: 199,823

[22] Filed: Feb. 22, 1994

[51] Int. Cl.$^6$ .................................................. H01C 10/16
[52] U.S. Cl. ........................... 338/128; 74/471 XY
[58] Field of Search ....................... 338/128; 74/471 XY, 74/148 B

[56] References Cited

U.S. PATENT DOCUMENTS

| | | |
|---|---|---|
| 3,918,021 | 11/1975 | Nishioka . |
| 4,382,166 | 5/1983 | Kim . |
| 4,469,330 | 9/1984 | Asher . |
| 4,763,100 | 8/1988 | Wood ........................................ 338/128 |
| 4,812,802 | 3/1989 | Nishiumi et al. ........................ 338/128 |
| 4,864,272 | 9/1989 | Cecchi et al. ............................ 338/128 |
| 4,962,448 | 10/1990 | De Maio et al. ..................... 338/128 X |

*Primary Examiner*—Marvin M. Lateef
*Attorney, Agent, or Firm*—Juettner Pyle Lloyd & Piontek

[57] ABSTRACT

A joystick controller is characterized by a control shaft that has toward its lower end a hemispherical-shaped member having a spherical surface. The control shaft extends upwardly through an opening in a top wall of a housing, and a circumference of the opening defines a bearing for the spherical surface of the control shaft hemispherical member while a bottom of the control shaft is pivotally supported on a fulcrum within the housing. An upper end of the control shaft is manually movable to pivot the control shaft, with the spherical surface then moving in the bearing. The control shaft is coupled to x-y movement indicators comprising linearly movable variable impedance devices, which generate signals in accordance with the amount and direction of pivotal movement of the control shaft.

19 Claims, 2 Drawing Sheets

JOYSTICK CONTROLLER

BACKGROUND OF THE INVENTION

The present invention relates to a joystick apparatus, for example of a type for controlling the operation of electronic games by controlling movement of a cursor on a video screen.

Controllers are known which are designed for the purpose of providing player input signals to video game circuitry. The joystick type of controller typically includes a pivotally mounted manually movable joystick control arm and means responsive to movement of the control arm for generating signals, which signals are interpreted by associated video game circuitry as desired motion or position signals for movable player display objects. Some joystick controllers are designed to produce digital motion signals, and such controllers may include a plurality of contact switches positioned at the four quadrants of a circle for the purpose of providing x-y switch closure signals. Other joystick controllers are designed to produce analog motion signals, and such may include a pair of potentiometers, each having a driven rotary shaft that follows the motion of a joystick control arm along a particular orthogonal axis. A joystick controller typically also includes an additional push button and associated switch for generating fire control signals for performing various operations, such as for launching a missile, serving a tennis ball, etc.

U.S. Pat. No. 3,918,021 to Nishioka et at. teach a joystick controller in which a bearing having a spherical bearing surface is in an opening in the center of a top wall of a controller housing. The bearing rotatably receives a spherical body to which a control shaft is fixed. A plurality of resistors are deposited in a selected configuration on a surface of a bottom wall of the housing. A pair of intersecting slidable members, each having an elongated guide slot and contactors at opposite ends thereof, is slidably movable in the housing, with the contactors in slidable engagement with associated resistors. A lower end of the control shaft extends through the guide slots of the intersecting members, and a universal joint operatively couples the lower end of the control shaft to a rotary disk having contactors. As the control shaft is pivoted in any direction to any tilt angle, the points of contact of the intersecting member contactors, with resistors representative of x-y directions, are simultaneously controlled in desired proportions. As the control shaft is rotated about its axis, the points of contact between contactors carried by the rotary disk and associated resistors are simultaneously controlled in desired proportions. The structure of the joystick controller is relatively complex.

OBJECTS OF THE INVENTION

An object of the invention is to provide an improved joystick controller, in which a joystick of the controller is directly mechanically coupled to a variable impedance in such manner that, upon pivotal movement of the joystick, the motion of the joystick is coupled to and linearly moves the variable impedance device to vary its impedance.

Another object of the invention is to provide such a joystick controller, in which pivotal movement of the joystick directly moves the variable impedance device without the use of compound motion.

A further object is to provide such a joystick controller, in which the joystick includes a hemispherical-shaped member that moves in a circular bearing formed in an opening through a top wall of a housing upon pivotal movement of the joystick.

Yet another object is to provide such a joystick controller, in which a lower end of the joystick is pivotally supported on a fulcrum that is located at the center of the hemispherical-shaped member.

SUMMARY OF THE INVENTION

In accordance with the present invention, there is provided a joystick controller comprising a housing and a joystick supported by the housing for pivotal movement in any direction to any tilt angle. Also included are a first variable impedance device supported by the housing and having a first control means that is linearly movable to vary the impedance of the first variable impedance device, and a second variable impedance device supported by the housing and having a second control means that is linearly movable to vary the impedance of the second variable impedance device. In addition, means are provided for mechanically coupling the first and second control means to the joystick for directly linearly moving the first and second control means in response to pivotal movement of the joystick to vary the impedances of the first and second variable impedance devices by respective amounts in accordance with the direction and amount of tilt of the joystick.

The foregoing and other objects, advantages and features of the invention will become apparent upon a consideration of the following detailed description, when taken in conjunction with the accompanying drawings.

DETAILED DESCRIPTION

Figure 1:
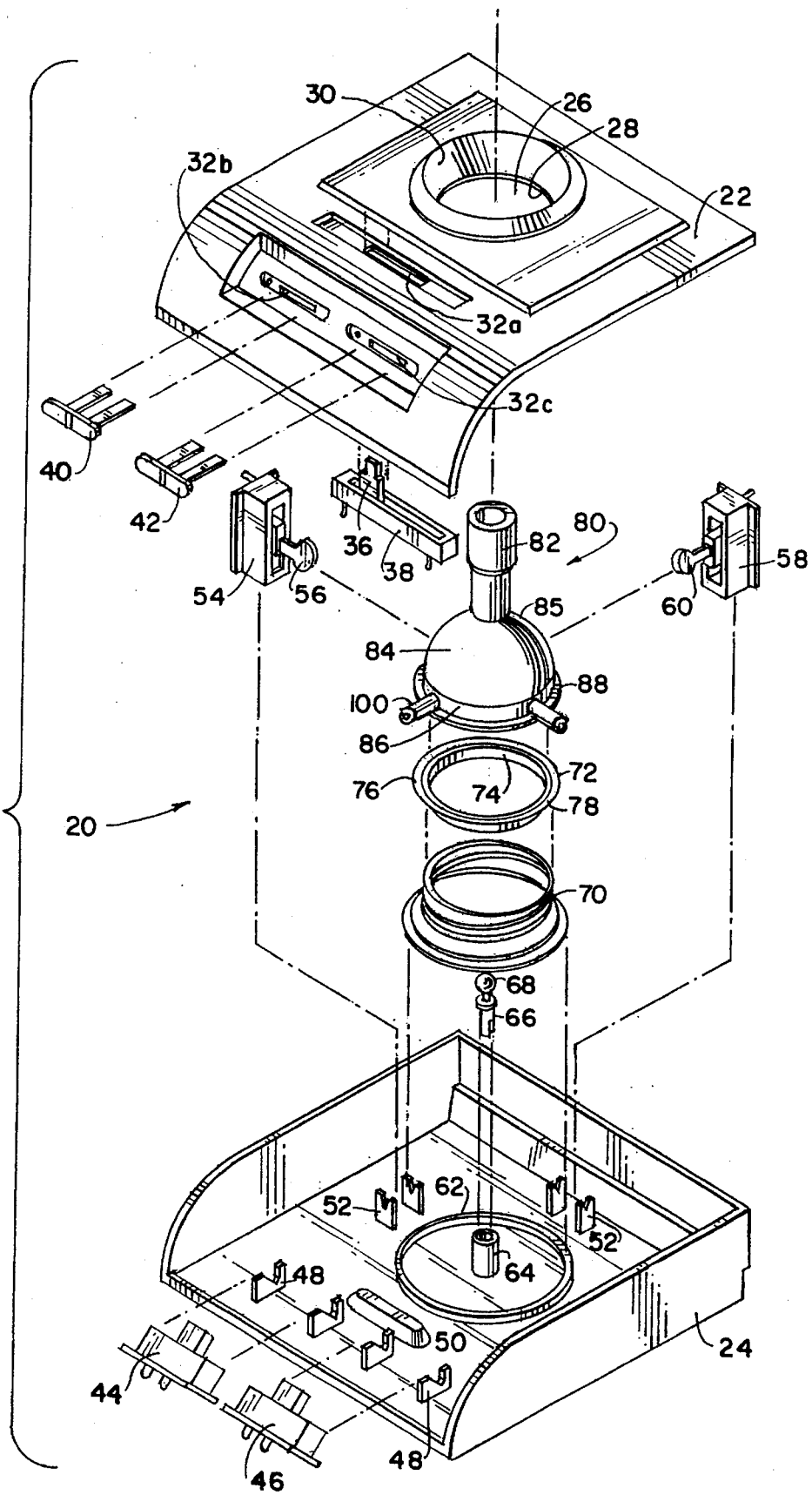
FIG. 1 is an exploded assembly view of a joystick controller structured according to the teachings of the present invention.
Figure 2:
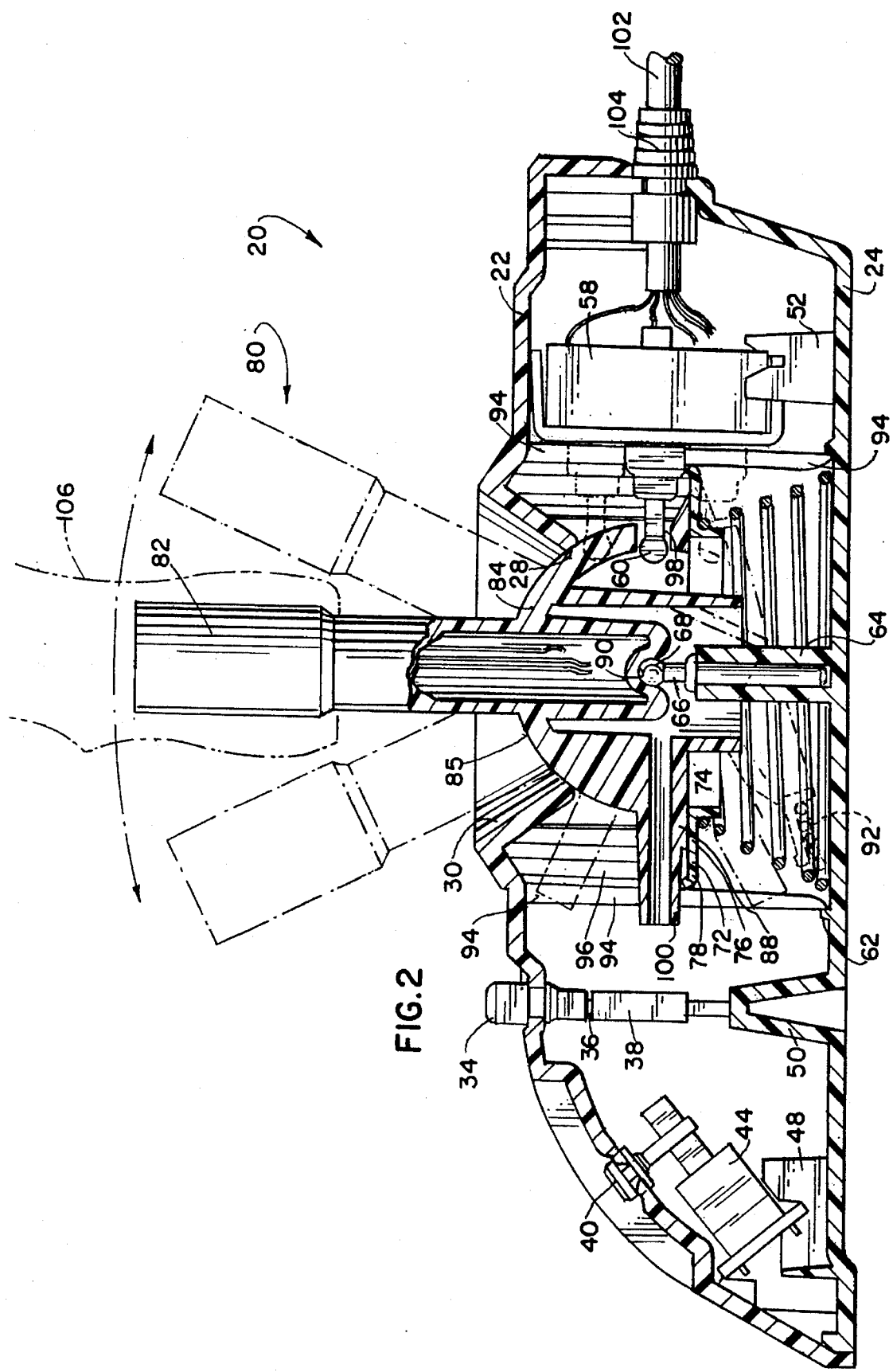
FIG. 2 is a cross-sectional side elevation view of the joystick controller.

FIGS. 1 and 2 illustrate the major components of a joystick controller, indicated generally at 20, constructed according to the teachings of the invention. The joystick controller comprises an upper housing portion 22 and a lower housing portion 24, which may be integrally formed of injection molded plastics and joined together by any suitable means to form a housing (FIG. 2) for containing and supporting the other joystick controller components. The upper housing portion has a circular opening 26 within a bearing surface 28 at a lower end of a downwardly depending frusto-conical portion 30 of a top wall of the upper housing. The upper housing also has a plurality of slots 32a–c. The slot 32a accommodates connection between an external manually movable knob 34 (FIG. 2) and a slider 36 of a potentiometer 38. The slots 32b and 32c accommodate connection between manually movable switch knobs 40 and 42 and associated switches 44 and 46. The potentiometer 38 and switches 44 and 46 provide control over and/or adjustment of selected features of a video game connected to the joystick controller.

The lower housing portion 24 has a bottom wall that includes two sets of brackets 48 for supporting the switches 44 and 46 and an upstanding support 50 on which a lower end of the potentiometer 38 rests. The lower housing further includes two sets of brackets 52 for supporting each of an x-direction signal generating variable impedance device, such as a potentiometer 54 having a linearly movable control means comprising a slider knob 56, and a y-direction signal generating variable impedance device 58, such as a potentiometer having a linearly movable control means comprising a slider knob 60. Linear movement of the slider knobs 56 and 60 of the potentiometers 54 and 58 causes the potentiometers to generate signals respectively representative of x and y coordinate axes movement, for example to be provided as an input to a video game.

The lower housing 24 has a circular rim 62 on its bottom surface, within which an upstanding pedestal 64 mounts an upstanding pivot pin 66 having a spherical fulcrum 68 at its top. A tapered helical controller spring 70 rests on the bottom surface with its larger diameter end within the circular rim. A ring 72, comprising a cylindrical inner part 74, an annular part 76 extending radially outwardly from an upper end of the cylindrical inner part, and a circular lip 78 extending upwardly and outwardly from an outer end of the annular part, is supported on the upper end of the controller spring with the cylindrical part 74 extending downwardly within, and the annular part 76 supported on and extending outwardly across, the uppermost convolution of the spring.

The controller 20 also includes a joystick, indicated generally at 80. The joystick comprises a control shaft 82, a lower end of which carries a hemispherical-shaped member 84 having a spherical surface 85. A cylindrical section 86 (FIG. 1) extends downwardly from a lower circumference of the hemispherical member and an annular flange 88 extends radially outwardly from the bottom of the cylindrical section. The control shaft 82 extends downwardly within the hemispherical member and at its bottom has a seat 90 that rests on the fulcrum 68.

To support the joystick 80 on the housing, the control shaft 82 is extended upwardly through the upper housing opening 26, the annular flange 88 at the lower end of the joystick is rested on the annular part 76 and within the outer circular lip 78 of the ring 72, and the seat 90 at the control shaft bottom is set upon the fulcrum 68. With the joystick so mounted, the spherical surface 85 of the hemispherical member 84 slidingly abuts the circular bearing 28 at the inner end of the frusto-conical portion 30, and the joystick is manually pivotable in any direction to any tilt angle about the fulcrum 68, with the spherical surface being in sliding engagement with and moving in the bearing. The pivot point of the joystick is at the intersection of two radii of the spherical surface, i.e., at the center of the spherical surface, and the spring 70 resists, but is yieldable to permit, pivoting of the joystick by selected amounts in any direction throughout 360° of arc. The tapered configuration of the spring 70 permits the spring convolutions to collapse within themselves as at 92, so as not to impede pivotal movement of the joystick.

A cylindrical wall 94 extends downwardly from the top wall of the upper housing 22, from around the frusto-conical portion 30 to a lower end received within the circular rim 62 on the bottom wall of the lower housing 24. The cylindrical wall has a plurality of ribs 96 that extend longitudinally along and radially inwardly of the cylindrical wall in arcuately spaced relationship, lowermost ends of which ribs are at a uniform level and comprise stop means adapted to be engaged by the upper end of the outer circular lip 78 of the ring 72 when the joystick is manually released and in a reference, rest or centered position. Thus, the controller spring 70, when the joystick is manually released, automatically mechanically centers the joystick by returning it to the rest position where the circular lip 78 is moved against and engages the lower ends of the ribs 96.

The joystick 80 is mechanically coupled to and adapted to directly linearly move the slider knobs 56 and 60 of the x-direction and y-direction variable impedance devices 54 and 58, to change the impedances exhibited by and to thereby cause the variable impedance devices to generate signals representative of x-y coordinate information in accordance with the direction and amount of joystick pivotal movement. To that end, the variable impedance devices, which may be variable potentiometers, are mounted 90° apart with respect to the joystick, along respective orthogonal axes, such that their slider knobs are movable vertically and are facing inwardly toward the joystick. The slider knobs are received in respective slots formed 90° apart in the joystick cylindrical section 86, such as within the slot 98 into which the slider knob 60 of the y-direction potentiometer 58 extends. To accommodate extension of the slider knobs from their associated potentiometers into their respective slots in the joystick, longitudinally extending openings are in the cylindrical wall 94 between the joystick cylindrical wall and the potentiometers 54 and 58, through which the slider knobs 56 and 60 respectively extend.

The arrangement is such that upon pivotal movement of the joystick 80, any component of motion of the joystick in the x-direction is directly mechanically coupled to and causes linear vertical movement of the slider knob 56 of the x-direction potentiometer 54 to cause the potentiometer to generate a signal representative of the amount by which the joystick is pivoted in the x-direction. Similarly, any component of movement of the joystick in the y-direction is directly mechanically coupled to and causes linear vertical movement of the slider knob 60 of the y-direction potentiometer 58 to cause the potentiometer to generate a signal representative of the amount by which the joystick is pivoted in the y-direction. To prevent rotation of the joystick, at least one boss 100 extends radially outwardly from the cylindrical section 86 and through a relatively narrow longitudinally extending slot in the cylindrical wall 94. Means are provided, such as a cable 102 extending through a strain relief 104, to connect with and carry signals generated by the potentiometers 38, 54 and 58, and by the switches 44 and 46, to a video game. Advantageously, an ergonometrically-shaped handle 106 is on the joystick control shaft 82.

The invention provides an improved joystick controller. The controller has automatic mechanical centering of the joystick, by virtue of the controller spring 70 normally returning the joystick to a centered rest position. Movement of the joystick is inherently smooth to the feel and a linear and uniform response is felt by a user. The smooth and uniform feel to a user is provided, in large part, by the novel and simplified structure of the controller, in that no compound motions are utilized in moving the x-direction and y-direction potentiometers. Instead, the potentiometers are directly coupled to and directly linearly movable by and in response to pivotal movement of the joystick.

While one embodiment of the invention has been described in detail, various modifications and other embodiments thereof may be devised by one skilled in the art, without departing from the spirit and scope of the invention, as defined in the appended claims.

What is claimed is:

1. A joystick controller, comprising a housing; a joystick supported by said housing for pivotal movement in any direction to any tilt angle; a first variable impedance device supported by said housing and having a first control means that is linearly movable to vary the impedance of said first variable impedance device; a second variable impedance device supported by said housing and having a second control means that is linearly movably to vary the impedance of said second variable impedance device; and means for mechanically coupling said first and second control means to said joystick for directly linearly moving said first and second control means in response to pivotal movement of said joystick to vary the impedances of said first and second variable impedance devices by respective amounts in accordance with the direction and amount of pivotal movement of said joystick, wherein said joystick comprises a control shaft having a lower end and a hemispherical-shaped member toward said control shaft lower end, said hemispherical-shaped member having a spherical surface, and said housing having at top wall, a circular opening in said too wall, a bearing surface around the circumference of said top wall opening, and a bottom wall, and including fulcrum means on said housing bottom wall, said joystick being supported by said housing with said control shaft extending through said housing top wall opening to the exterior of said housing, with said spherical surface of said hemispherical-shaped member slidingly engaging said bearing surface around said opening for movement therein, and with a bottom end of said control shaft resting on said fulcrum means for pivotal movement of said joystick about said fulcrum means.

2. A joystick controller as in claim 1, wherein said first and second variable impedance devices are supported by said housing at locations 90° apart with respect to said joystick.

3. A joystick controller as in claim 1, wherein said first and second control means are mechanically coupled to said joystick at locations along respective orthogonal axes, so that the impedances of said first and second variable impedance devices vary by amounts in accordance with the components of pivotal movement of said joystick along said respective orthogonal axes.

4. A joystick controller as in claim 3, wherein said first and second variable impedance devices are first and second variable potentiometers, and said orthogonal axes lie along respective x and y directions of movement of said joystick.

5. A joystick controller as in claim 3, including means for preventing rotation of said joystick relative to said orthogonal axes.

6. A joystick controller as in claim 1, wherein said hemispherical-shaped member is mechanically coupled to said first and second control means for directly linearly moving said first and second control means in response to pivotal movement of said joystick to vary the impedances of said first and second variable impedances by respective amounts in accordance with the direction and amount of pivotal movement of said joystick.

7. A joystick controller as in claim 6, said joystick including a cylindrical part extending downwardly from a lower end of said hemispherical-shaped member, said first and second control means being mechanically coupled to said cylindrical part.

8. A joystick controller as in claim 7, wherein said first and second control means are linearly movable in vertical directions.

9. A joystick controller as in claim 7, wherein said cylindrical part has first and second slots facing said first and second variable impedances and said first and second control means are received in said first and second slots to mechanically couple said first and second control means to said cylindrical part.

10. A joystick controller as in claim 1, including means carried by said housing for urging said joystick to a reference position.

11. A joystick controller as in claim 10, wherein said urging means comprises spring means.

12. A joystick controller as in claim 1, including means for moving said joystick to a reference position, said moving means including stop means, and resilient means for moving said joystick toward said reference position, said stop means blocking further movement of said joystick upon said joystick being moved to, and locating said joystick at, said reference position.

13. A joystick controller as in claim 12, said resilient means comprising a coil spring under compression between said housing bottom wall and said hemispherical-shaped joystick member.

14. A joystick controller as in claim 13, including an annular ring between said hemispherical-shaped member and an upper end of said coil spring, said annular ring having a circumferential periphery that is moved against said stop means when said joystick is at said reference position to locate said joystick at said reference position.

15. A joystick controller as in claim 14, wherein said coil spring is tapered along its length.

16. A joystick controller, comprising a housing; a joystick supported by said housing for pivotal movement in any direction to any tilt angle; a first variable impedance device supported by said housing and having a first control means that is linearly movable to vary the impedance of said first variable impedance device; a second variable impedance device supported by said housing and having a second control means that is linearly movable to vary the impedance of said second variable impedance device; and means for mechanically coupling said first and second control means to said joystick for directly linearly moving said first and second control means in response to pivotal movement of said joystick to vary the impedances of said first and second variable impedance devices by respective amounts in accordance with the direction and amount of pivotal movement of said joystick, said joystick comprising a control shaft having a lower end and a hemispherical-shaped member toward said control shaft lower end, said hemispherical-shaped member having a spherical surface, and said housing having a top wall, a circular opening in said top wall, and a bearing surface around the circumference of said top wall opening, and including fulcrum means for supporting said joystick for pivotal movement with said control shaft extending through said housing too wall opening to the exterior of said housing and with said spherical surface of said hemispherical-shaped member slidingly engaging said bearing surface around said opening for movement therein.

17. A joystick controller as in claim 14, wherein said first and second variable impedance devices are supported by said housing at locations 90° apart with respect to said joystick.

18. A joystick controller as in claim 16, wherein said first and second control means are mechanically coupled to said joystick at locations along respective orthogonal axes, so that the impedances of said first and second variable impedance devices vary by amounts in accordance with the components of pivotal movement of said joystick along said respective orthogonal axes.

19. A joystick controller as in claim 18, wherein said first and second variable impedance devices are first and second variable potentiometers, and said orthogonal axes lie along respective x and y directions of movement of said joystick.

* * * * *